United States Patent [19]

Kuhn

[11] Patent Number: 6,123,973
[45] Date of Patent: Sep. 26, 2000

[54] METHODS OF PREPARATION AND USING ANTIMICROBIAL PRODUCTS

[75] Inventor: Dale F. Kuhn, Shawnee Mission, Kans.

[73] Assignee: Tillin, Inc., Shawnee Mission, Kans.

[21] Appl. No.: 09/217,382

[22] Filed: Dec. 21, 1998

Related U.S. Application Data

[63] Continuation-in-part of application No. 08/725,006, Oct. 1, 1996, Pat. No. 5,858,447, which is a continuation-in-part of application No. 08/482,772, Jun. 7, 1995, abandoned, which is a continuation-in-part of application No. 08/363,716, Dec. 23, 1994, abandoned, which is a continuation-in-part of application No. 08/099,939, Jul. 30, 1993, abandoned.

[51] Int. Cl.⁷ ............................. A23L 3/34; A23L 1/222; A01N 25/00
[52] U.S. Cl. ..................... 426/532; 426/653; 426/654; 424/405
[58] Field of Search ................... 426/321, 323, 426/326, 331, 653, 654, 532; 424/442, 405

[56] References Cited

U.S. PATENT DOCUMENTS

| | | | |
|---|---|---|---|
| 2,903,361 | 9/1959 | Marks et al. | 99/93 |
| 3,144,339 | 8/1964 | Dalby et al. | 99/91 |
| 3,404,987 | 10/1968 | Koolstra et al. | 99/150 |
| 3,617,312 | 11/1971 | Rose | 99/176 |
| 3,640,730 | 2/1972 | Rolland et al. | 99/91 |
| 3,692,534 | 9/1972 | Ueno et al. | 99/90 |
| 3,840,668 | 10/1974 | Joiner | 426/22 |
| 3,899,594 | 8/1975 | Nickerson et al. | 426/9 |
| 3,900,570 | 8/1975 | Stigler | 426/9 |
| 3,937,814 | 2/1976 | Nickerson et al. | 424/93 |
| 4,045,585 | 8/1977 | Appleman et al. | 426/331 |
| 4,330,562 | 5/1982 | Nassar | 426/310 |
| 4,372,982 | 2/1983 | Haasl et al. | 426/549 |
| 4,374,150 | 2/1983 | Harrell et al. | 426/19 |
| 4,416,904 | 11/1983 | Shannon | 426/19 |
| 4,434,185 | 2/1984 | Nelson | 426/308 |
| 4,529,609 | 7/1985 | Gaehring et al. | 426/532 |
| 4,592,915 | 6/1986 | Goyette et al. | 426/321 |
| 4,642,237 | 2/1987 | De Stefanis et al. | 426/64 |
| 4,659,576 | 4/1987 | Dahle et al. | 426/324 |
| 4,867,204 | 9/1989 | Ellis et al. | 138/118.1 |
| 4,925,684 | 5/1990 | Simon | 426/107 |
| 4,965,082 | 10/1990 | Chawan et al. | 426/331 |
| 5,017,612 | 5/1991 | Nayfa | 514/557 |
| 5,035,904 | 7/1991 | Huang et al. | 426/243 |
| 5,145,699 | 9/1992 | Dijkshoorn et al. | 426/94 |
| 5,161,549 | 11/1992 | Rosario | 131/331 |
| 5,180,604 | 1/1993 | Crane et al. | 426/582 |
| 5,194,271 | 3/1993 | Yasosky | 426/92 |
| 5,198,254 | 3/1993 | Nisperos-Carriedo et al. | 426/92 |
| 5,318,785 | 6/1994 | DeStefanis | 426/20 |
| 5,547,987 | 8/1996 | Bland et al. | 514/557 |

FOREIGN PATENT DOCUMENTS

| | | |
|---|---|---|
| 5 6092-733 | 12/1979 | Japan . |
| 454 594 | 6/1998 | Switzerland . |
| 421006 | 12/1934 | United Kingdom . |
| 1360145 | 7/1974 | United Kingdom . |
| 2264429 | 9/1993 | United Kingdom . |
| WO 98 42205A | 10/1998 | WIPO . |

OTHER PUBLICATIONS

G. Hawley, Condensed Chemical Dictionary, 10th Ed. 1981, Van Nostrand Reinhold Company, New York, pp. 253–254 and 1110.

*Primary Examiner*—Anthony J. Weier
*Attorney, Agent, or Firm*—Jeffrey L. Thompson; Thompson & Thompson, P.A.

[57] ABSTRACT

Novel antimicrobial products and methods of making and using the same are shown, whereby the products can be used in the same or greater percentages as conventional microbial growth inhibitors without imparting an off-flavor, taste, color or odor to the products in which they are used. The antimicrobial products are formed by reacting azodicarbonamide or an ammonia gas with a compound selected from the group consisting of benzoic acid, sodium benzoate, calcium benzoate, potassium benzoate, acetic acid, sodium diacetate, paraben, niacin, calcium acetate, calcium diacetate, citric acid, lactic acid, fumaric acid, sorbic acid, sodium sorbate, calcium sorbate, potassium sorbate, propionic acid, sodium propionate, calcium propionate, potassium propionate and mixtures thereof. In one embodiment, the product is prepared by placing a layer of azodicarbonamide on a substrate and covering the layer with a gas permeable separator. The antimicrobial compound is then added on top of the separator, and the combination is heated to form the final product. In another embodiment, the product is prepared by exposing the antimicrobial compound to an ammonia gas. The ammonia gas reacts with free acids in the antimicrobial compound to convert the free acids into ammonium salts, thereby eliminating off-flavor and off-odor of the resulting antimicrobial product. The antimicrobial products prepared according to the present invention are suitable for use in foodstuffs, sanitation products, cosmetics, pharmaceuticals, and so forth.

17 Claims, 3 Drawing Sheets

METHODS OF PREPARATION AND USING ANTIMICROBIAL PRODUCTS

RELATED APPLICATIONS

This application is a continuation-in-part of U.S. application Ser. No. 08/725,006, filed on Oct. 1, 1996, now U.S. Pat. No. 5,858,947, which was a continuation-in-part of U.S. application Ser. No. 08/482,772 filed Jun. 7, 1995 (now abandoned), which was a continuation-in-part of U.S. application Ser. No. 08/363,716 filed Dec. 23, 1994 (now abandoned), which was a continuation-in-part of U.S. application Ser. No. 08/099,939 filed Jul. 30, 1993 (now abandoned), all of which are incorporated herein by reference.

FIELD OF THE INVENTION

The present invention relates generally to antimicrobial products for use in foodstuffs, sanitation, cosmetics., pharmaceuticals, and methods of preparing such products. More particularly, this invention relates to antimicrobial products and novel methods of preparing such products that inhibit the growth of molds, rope, yeasts and bacteria. The antimicrobial products of the present invention can be incorporated into foodstuffs, cosmetics, and pharmaceuticals, or used to sanitize food equipment, filters, humidifiers, and other applications where control of microorganisms is desired. The present invention substantially reduces or eliminates the off-flavor, off-texture, off-color and/or off-odor that other known preservatives and antimicrobial products impart.

BACKGROUND OF THE INVENTION

The growth of mold, rope, yeasts and bacteria is a significant problem in packaged or processed foods such as dairy products, margarine, butter, baked goods, fruit and vegetable containing products such as fruit fillings for pies or pastries, and processed meats. The growth of mold, rope, yeasts and bacteria not only significantly reduces the useful shelf life of the product, thus increasing the sellers' direct costs due to stale or moldy products that cannot be sold, but also requires that certain items be refrigerated during shipping and/or at the marketplace, which causes additional indirect expenses for the end seller of the product.

Various food preservatives are on the market. However, when used at concentrations that effectively increase shelf life, the prior art food preservatives impart an off-flavor, odor, color and/or texture to the final product that is undesirable. Consequently, a need exists for a food preservative that increases the shelf life of the product while not requiring refrigeration or causing off-flavor, color, odor and/or texture.

DESCRIPTION OF THE PRIOR ART

Calcium propionate and potassium sorbate are recognized mold inhibitors. U.S. Pat. Nos. 3,900,570 and 4,416,904 both disclose the use of calcium propionate, potassium sorbate and sodium benzoate at very low concentrations as optional mold inhibitors. For example, U.S. Pat. No. 3,900,570 discloses a maximum usage of calcium propionate of 0.25 parts by weight per 100 parts of flour in the finished dough, with the preferred range being about 0.06 to about 0.12 parts. In U.S. Pat. No. 4,416,904, similar concentrations are disclosed: 0.04% to 0.10% for sodium benzoate, 0.05% to 0.20% for sorbic acid, and 0.4% for calcium propionate. In contrast, the novel compound of the present invention may be used at about these same ranges and also up to about 5.0 percent by total weight of ingredients used to prepare the foodstuff, with the optimum percentage depending on the food product and the desired shelf life.

The low concentrations of mold inhibitors used in prior art products are necessary due to the off-flavor, odor, taste and/or texture imparted by low levels of free acids that are present as impurities in the antimicrobial products, such as propionate or sorbate. These free acids are particularly noticeable when the concentration levels of the food preservatives are increased. To date, no one has effectively prepared a food preservative that incorporates either a propionate or sorbate such that, when used at increased levels, it does not impart an undesirable off-flavor, odor, or texture.

U.S. Pat. No. 3,900,570 discloses a process for making yeast leavened bread using, among other things, a "fermentation adjuvant" containing an emulsifying agent, a yeast nutrient, an oxidizing agent such as azodicarbonamide, and a mold inhibitor such as calcium propionate or sodium propionate. The adjuvant is prepared by blending together the emulsifying agent, yeast nutrient, and oxidizing agent until the yeast nutrient and the oxidizing agent are encapsulated by the emulsifying agent. According to the teachings of U.S. Pat. No. 3,900,570, if a mold inhibitor is used, it is added only after the oxidizing agent is encapsulated by the emulsifying agent. The resulting adjuvant is then added to a bread dough, and the dough is cooked at a suitable temperature. U.S. Pat. No. 3,900,570 does not teach that gases, such as those derived from decomposing azodicarbonamide, can be reacted with a suitable mold inhibitor compound to remove the free acids from the compound and, thereby, cleanse the off-flavor and off-odor from the mold inhibitor compound.

Refrigeration has also been used to inhibit mold growth. However, for many food items, refrigeration is not available or is impractical due to limited space and excessive cost.

Consequently, a need exists for a product that inhibits the growth of microorganisms and, thus, extends the shelf life of a foodstuff containing the antimicrobial product without imparting an off-flavor, either bitter or acidic, off-odor and/or off-texture. It is even more desirable that microbiological activity be inhibited without adverse side effects and without the need for refrigeration. Additionally, the antimicrobial product should use relatively inexpensive and available ingredients in such quantities as to be commercially economical.

SUMMARY OF THE INVENTION

The present invention provides novel compounds, and methods of making and using the same, for inhibiting the growth of molds, rope, yeasts and bacteria in dairy products such as margarine, butter, cream cheese, whipped cream, and shredded cheese; baked goods such as bagels, pound cake and pastries; fried goods such as corn and wheat tortillas; fruit containing products such as juices and fruit fillings for pies and pastries; processed meats; and medical products, pharmaceuticals and cosmetics. The foodstuffs incorporating the products of the present invention have increased shelf lives because the products, especially at higher concentrations, are more effective than current day antimicrobial products. The products of the present invention can also be used to sanitize food equipment, filters, humidifiers and various other applications where control of microorganisms is desired.

The present invention has evolved through three phases of development, which will be referred to herein as the "inclusion" phase, the "separation" phase, and the "gas" phase of the invention. The applicant first developed the inclusion phase of the invention, which involved mixing azodicarbonamide with an antimicrobial compound and heating the mixture to cause a reaction between the two compounds. Next, the applicant developed the separation phase of the invention, which uses a separator means, such as a stainless steel mesh, to keep the azodicarbonamide separate from the antimicrobial compound. In the separation phase, the azodicarbonamide is heated to cause a reaction between the gases of the decomposing azodicarbonamide and the antimicrobial compound. Finally, the applicant developed the gas phase of the invention, which involves reacting a gas, preferably ammonia gas or a mixture containing ammonia gas, with an antimicrobial compound to eliminate the free acids in the compound. Each of these three phases of development of the present invention will be described below.

In each of the three phases of development of the present invention, an improved antimicrobial product is prepared by eliminating free acids that are present as impurities in the organic acidic compounds used as microbial growth inhibitors. Acids can exist either as a free acid or as one of their associated salts. For example, propanoic (propionic) acid can exist as, but is not limited to, one of the following salts: sodium propanoate, calcium propanoate, magnesium propanoate, potassium propanoate, and ammonium propanoate. The salts of these acids, however, have different properties, for example taste and odor, than do the free acids from which they were derived.

In the food industry, several salts of various acids are employed. Unfortunately, the commercial grades of these salts that are available to the food industry contain small amounts of the various free acids. These small amounts of free acid tend to impart undesirable tastes and/or odors to the product. The present invention offers an effective means of converting any of the residual free acids that may be present in the commercial grade salts into the ammonium salts by exposure to ammonia gas, thereby eliminating undesirable tastes and odors.

The conversion of free acids into their ammonium salts when exposed to ammonia gas is a universal reaction, applicable to any free acid. For example, ethanoic (acetic) acid becomes ammonium acetate when exposed to ammonia gas; porpanoic (porpionic) acid becomes ammonium propanoate; butanoic (butyric) acid becomes ammonium butanoate; pentanoic (valeric) acid becomes ammonium pentanoate; sorbic acid becomes ammonium sorbate; and so forth. The small amounts of these ammonium salts that result from the reaction do not impart any undesirable tastes and odors to the final product.

In a first embodiment of the inclusion phase of the invention, azodicarbonamide is mixed with a second compound, which is generally a salt of an organic acidic compound. In a second embodiment, a third compound is added to this same mixture to lower the decomposition temperature of the azodicarbonamide.

In the first and second embodiments, the novel antimicrobial product is ultimately a dry powder mixture. The manner in which either embodiment is added to a food product is dependent on the temperature at which the food product will be processed. If the foodstuffs will be baked or processed at temperatures above a certain level, the antimicrobial product can be added directly to the raw ingredients used to prepare the final food product. If the processing temperature is below a certain level, the dry mixture is first heated to cause a reaction between the decomposing gases of the azodicarbonamide, particularly ammonia gas, and the second compound.

Third and fourth embodiments of the present invention are directed to the separation phase of the invention. In the third embodiment, an antimicrobial product is prepared by placing a layer of azodicarbonamide on a substrate and then covering the layer with a gas permeable separator. A second compound, which is generally a salt of an organic acidic compound, is then added on top of the separator, and the combination is heated to form the final product. In the fourth embodiment, the third compound for lowering the decomposition temperature of azodicarbonamide is added to the azodicarbonamide before the mixture is placed on the substrate. The mixture is then covered with the separator, and the second compound is overlaid on the separator means. The combination is then heated to produce the final product.

A fifth embodiment of the present invention is directed to the gas phase of the invention. In the fifth embodiment, the second compound (salt of an organic acidic compound) is mixed and reacted with ammonia gas to convert free acid impurities in the second compound into ammonium salts. The ammonia gas is removed from the final product using heat or vacuum. The resulting antimicrobial product imparts little or no off-flavor, off-texture, off-color or off-odor into the foodstuffs or other products in which it is used.

By heating the antimicrobial products in the inclusion and separation phases of this invention, either during processing or before the antimicrobial product is added to the raw materials of the foodstuff or other products, the azodicarbonamide decomposes into gases, among which is an ammonia gas. The ammonia gas reacts with the free acids in the second compound, which are present as impurities, and converts the free acids into ammonium salts. By eliminating the free acids in the antimicrobial product, the main source of undesirable tastes and odors in the product is also eliminated. Thus, the resulting antimicrobial product of the present invention does not impart any off-flavor, odor or texture normally imparted by conventional mold growth inhibitors, such as sorbates and propionates.

In the separation phase embodiments of the present invention, the azodicarbonamide can be kept totally separate from the foodstuffs in which the antimicrobial product is to be used. This is an important advantage over the inclusion phase embodiments because azodicarbonamide is not approved for use as a food additive in certain countries for certain types of food. Keeping the azodicarbonamide totally separate from such food products eliminates any health risks that may be associated with the compound, thereby ensuring that the resulting product is safe to use.

In both the separation and gas phase embodiments of the present invention, the critical reaction between the gases and the mold inhibitor compound occurs before adding the resulting antimicrobial product to a foodstuff or other product. This is significant because it permits the antimicrobial product of the present invention to be prepared separately and then used for foodstuffs processed at relatively low temperatures, such as cheese and milk. For example, by heating the azodicarbonamide to its critical temperature for decomposition (e.g., 385° F.) and reacting the gases derived from the decomposition with the mold inhibitor compound before it is added to a foodstuff, the superior results of the present invention can be attained in foodstuffs, such as cheese and milk, which are never heated above 140° F., for example.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
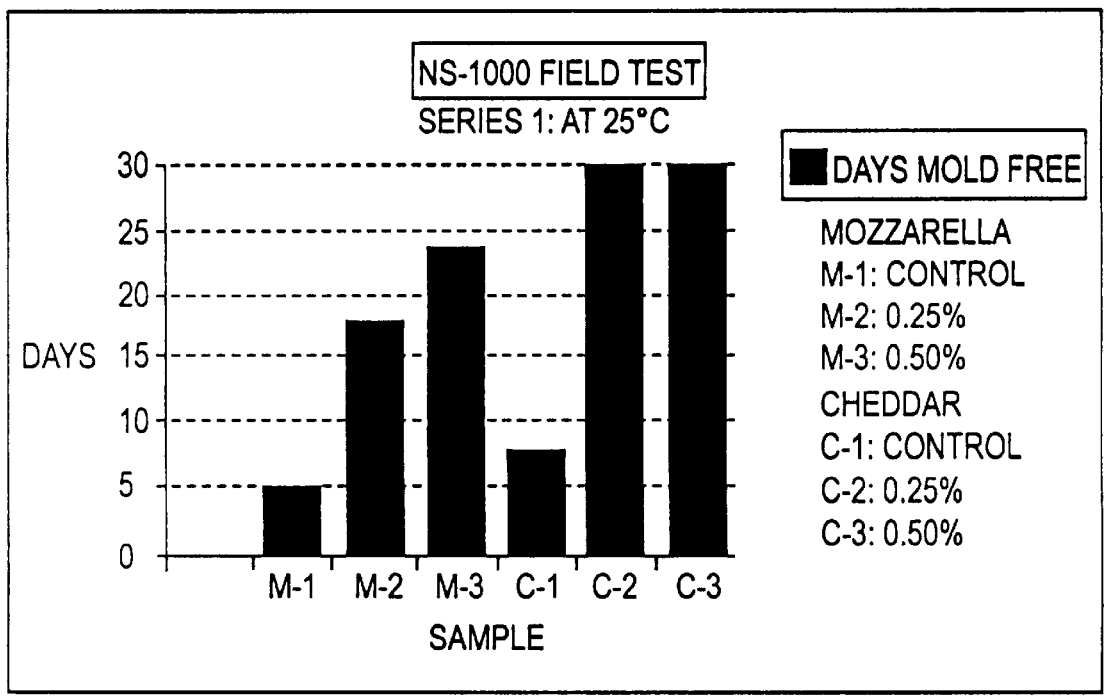
FIG. 1 is a Summary of Yeast and Mold Growth on Cheeses at 25° C. (76° F.)

As required, a detailed description of each embodiment of the present invention is provided herein. It is, however, to be understood that the disclosed embodiments are merely illustrative of the invention, which may be embodied in various forms. Therefore, specific structural and functional details disclosed herein are not to be interpreted as limiting, but merely as a basis for the claims and as a representative basis for teaching one skilled in the art to employ the antimicrobial products of the present invention in appropriate products.

According to the present invention, an antimicrobial product is provided for bakery products, dairy products, fruit containing products such as pie, juice or pastry fillings, processed meats, pharmaceuticals and cosmetics. The antimicrobial product of the present invention also has other applications, such as, for example, sanitizing food preparation equipment, inhibiting the growth of microorganisms on air filters, humidifiers, and so forth.

The first embodiment of the antimicrobial product is a dry powder mixture including azodicarbonamide as a first compound, and a second compound selected from the group consisting of benzoic acid, sodium benzoate, calcium benzoate, potassium benzoate, acetic acid, sodium diacetate, paraben, niacin, calcium acetate, calcium diacetate, citric acid, lactic acid, fumaric acid, sorbic acid, sodium sorbate, calcium sorbate, potassium sorbate, propionic acid, sodium propionate, calcium propionate, potassium propionate and mixtures thereof, and preferably calcium propionate, sodium propionate, potassium sorbate and mixtures thereof. The first embodiment of the present invention is referred to in this application as the inclusion phase of the invention because the azodicarbonamide is mixed directly into the second compound.

In reference by total weight of the antimicrobial product, in the first embodiment, the first compound is present in the amount of about 0.001 to about 5.0 percent by weight, preferably about 0.001 to about 0.01 percent by weight; and the second compound is present in the amount of about 99.999 to about 95.0 percent by weight, preferably 99.999 to about 99.99 percent by weight.

Azodicarbonamide is an organic salt normally used as a dough conditioner or oxidizing agent in the food industry. It is also used as a blowing agent in the rubber industry. Azodicarbonamide is normally used in baked goods to reduce the stickiness of the dough, which in turn, makes processing easier. To date, it has not been used as an ingredient for mold inhibiting products. In fact, FDA approval in the United States has only issued for using azodicarbonamide as a maturing or oxidizing agent. Azodicarbonamide is commercially available under the trademark "AZ-130," from the Sherex Chemical Company of New York as well as other sources. When azodicarbonamide reacts with the second compound, it provides the unexpected results of altering the second compound such that the final product will not impart an off-flavor, off-odor, off-texture or off-color to the foodstuff.

If the antimicrobial product of the first embodiment will be added to foodstuffs exposed to temperatures above about 360° F. during processing, the product is added directly to the raw ingredients of the foodstuff at about 0.01 to about 20.0 percent by total weight of raw ingredients, preferably about 0.5 to about 5.0 percent.

If the foodstuff will not be exposed to temperatures of above about 360° F., the product of the first embodiment is first heated to a temperature of about 360° F. to about 475° F., preferably about 400° F., for a sufficient time to cause the azodicarbonamide to decompose and react with the second compound, about 20 to about 30 minutes, preferably 25 minutes. The resultant product is then added to the raw ingredients of the food product at about 0.01 to about 20.0 percent by total weight of raw ingredients used to produce the foodstuff.

The second embodiment comprises azodicarbonamide, the second compound of the first embodiment, and a third compound that reduces the decomposition temperature of azodicarbonamide. The third compound is a metal oxide such as zinc oxide, a metal salt, an organometallic complex such as barium, zinc, or calcium stearate, or other compounds such as citric acid, triethanolamine, or calcium sulfate, the preferred being citric acid or zinc oxide.

In reference by weight of antimicrobial product, in the second embodiment, the first compound is present in the amount of about 0.001 to about 5.0 percent by weight, preferably about 0.001 to about 0.01; the second compound is present in the amount of about 99.995 to about 70.0 percent by weight, preferably 99.995 to about 98.59; and the third compound is present in the amount of about 0.004 to about 30.0 percent by weight, preferably 0.004 to about 1.4.

Again, whether initial processing of the second embodiment of the mold inhibitory compound is required will be dependent on the temperature at which the foodstuff is processed. If the foodstuffs will be baked or processed at temperatures of above about 320° F., the antimicrobial product can be added directly to the raw ingredients of the foodstuff. If the processing temperature is below this range, the dry mixture of the second embodiment is first heated to cause a reaction between the azodicarbonamide and the second compound. For example, the dry mixture can be heated to a temperature of about 320° F. to about 475° F., preferably about 325° F. to 365° F., for a sufficient time, about 6 to about 10 minutes, preferably about 8 minutes. The resultant product is then added to the raw ingredients of the foodstuff at about 0.5 to about 5.0 percent by total weight of raw ingredients.

Figure 3:
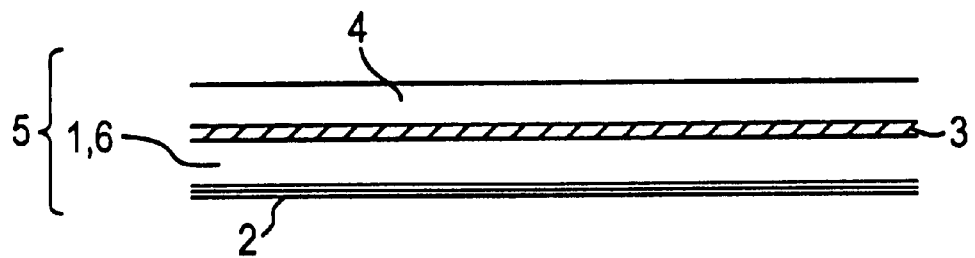
FIG. 3 is a diagram for illustrating the separation phase embodiments of the present invention.

Referring to FIG. 3, the third embodiment of the present invention will be described. The third embodiment is referred to in this application as the separation phase of the invention because the azodicarbonamide is kept separate from the second compound. In the third embodiment, the antimicrobial product is prepared using a tri-layered combination of materials and then heating the same. A substantially uniform first layer 1 comprising azodicarbonamide is placed on a substrate 2, which may be any material capable of serving as a base to hold a layer of azodicarbonamide and withstanding temperatures between about 200° to 500° F., but is preferably a planar metal baking sheet or the like. Next, a separator 3 having gas permeability is overlaid on the first layer 1 of azodicarbonamide. The gas permeable separator 3 may comprise any material capable of separating two layers of dry compounds while remaining permeable to air and other gases. Stainless steel wire mesh is the preferred material to serve this purpose.

A second compound 4, which is generally a salt of an organic acidic compound selected from the group consisting of benzoic acid, sodium benzoate, calcium benzoate, potassium benzoate, acetic acid, sodium diacetate, paraben, niacin, calcium acetate, calcium diacetate, citric acid, lactic acid, fumaric acid, sorbic acid, sodium sorbate, calcium sorbate, potassium sorbate, propionic acid, sodium propionate, calcium propionate, potassium propionate and mixtures thereof, is then superimposed onto the separator to form a tri-layered combination 5. The tri-layered combination 5 is then heated for a sufficient time and at a sufficient temperature to alter the characteristics of the second compound, namely to eliminate the off-flavor, off-odor, off-texture and off-color generally imparted by the second compound.

Although not desiring to be bound by one theory, the applicant believes that during the heating step, the azodicarbonamide decomposes and emits gases that permeate the separator 3 and react with the second compound 4. Among the emitted gases is an ammonia gas that converts the free acids in the second compound into ammonium salts, thereby creating the desired antimicrobial product. The desired results have been achieved by heating the tri-layered combination at greater than about 320° F., preferably 385° F., for about 20 minutes. The final product, which is in dry powder form, can then be added directly to the raw ingredients of the foodstuff at about 0.01 to about 20.0 percent by total weight of raw ingredients, preferably about 0.5 to about 5.0 percent.

Again referring to FIG. 3, the fourth embodiment of the present invention is a variation of the separation phase of the third embodiment, wherein a decomposition enhancing compound is mixed with the azodicarbonamide to form a dry mixture 6. The mixture 6 is then placed on the substrate 2 and covered with the separator 3. The second compound (a salt of an organic acidic compound) is then overlaid on the separator 3 to form a tri-layered combination 5. The combination 5 is then heated at a sufficient temperature for a sufficient time to produce the desired final product.

The decomposition enhancing compound is added to reduce the decomposition temperature of the azodicarbonamide. The decomposition enhancing compound is the same as that referred to as the third compound in the above description of the second embodiment. About 0.004 to about 30.0 percent by weight of the third compound is mixed with the azodicarbonamide in the fourth embodiment, with the preferred range being about 0.004 to about 1.4 percent.

Without the addition of the decomposition enhancing compound, the decomposition temperature of azodicarbonamide is about 360° F. The addition of the third compound lowers the decomposition temperature to about 320° F. Upon decomposition, the azodicarbonamide releases gases such as nitrogen, carbon monoxide, carbon dioxide, and ammonia that permeate through the second compound. The ammonia gas from this decomposition converts the free acid impurities in the second compound into ammonium salts to achieve the desired results.

Figure 4:
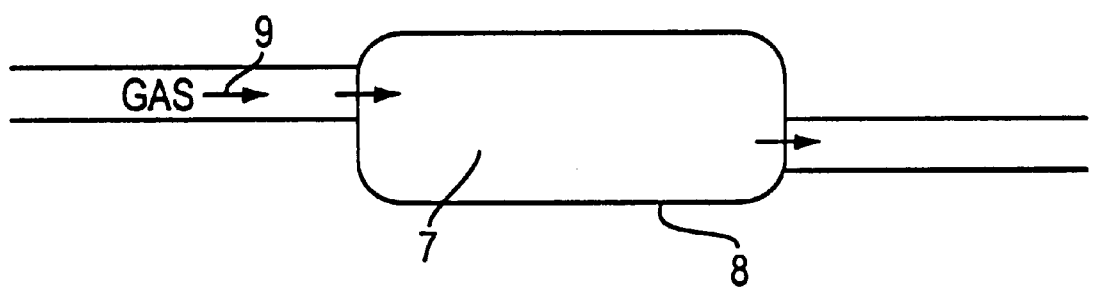
FIG. 4 is a diagram for illustrating the gas phase embodiment of the present invention.

Referring to FIG. 4, the gas phase embodiment of the present invention will now be described. In the gas phase embodiment, the novel antimicrobial product is prepared by first placing a salt of an organic acidic compound 7 selected from the group consisting of benzoic acid, sodium benzoate, calcium benzoate, potassium benzoate, acetic acid, sodium diacetate, paraben, niacin, calcium acetate, calcium diacetate, citric acid, lactic acid, fumaric acid, sorbic acid, sodium sorbate, calcium sorbate, potassium sorbate, propionic acid, sodium propionate, calcium propionate, potassium propionate and mixtures thereof, inside a gas-tight chamber 8. The chamber 8 can be any suitable gas-tight container capable of holding the organic acidic compound 7 and allowing gases to mix and react with the compound 7.

The organic acidic compound 7 is then mixed with an ammonia gas 9 or mixture of gases containing ammonia gas, such as ammonia gas and air or a mixture of gases similar to that derived from decomposing azodicarbonamide. The organic acidic compound 7 is exposed to the gas 9 for a sufficient time for a uniform exposure to achieve the desired result of creating a food preservative product that does not impart an off-flavor, off-odor, off-color or off-texture. The time of exposure is dependent on the size of the chamber 8, the amount of organic acidic compound 7 to be mixed with the gas 9, and the temperature and pressure within the chamber 8.

In this gas phase of the present invention, the total pressure of the ammonia gas plus any other gases, such as air, acting as diluents would normally be 1 atmosphere, primarily for operating convenience. The partial pressure of the ammonia gas would range from about 0.01 atmospheres to about 1.0 atmospheres. Mechanical blending is preferably carried out while the compound 7 is in contact with the ammonia gas 9 in order to expose all of the compound 7 to the ammonia gas 9 for a complete and efficient reaction. The reaction of the ammonia gas 9 with the organic acidic compound 7 in the vessel 8 will be virtually instantaneous. The exposure time of the product to the ammonia gas 9 would normally be one minute or greater, but could be less since the reaction is very swift.

The excess ammonia gas 9 is removed from the organic acidic compound 7 after the reaction time is completed by applying a vacuum to the vessel 8 of about 0.9 atmospheres to about 0.0001 atmospheres. Alternatively, the organic acidic compound 7 can be heated to a sufficient temperature to aid in the removal of any excess ammonia gas 9 from the compound 7. It is contemplated that the excess ammonia gas will be piped from the vessel 8 to a tank where it will be captured and reused, for example, as an agricultural fertilizer.

The resulting antimicrobial product of the embodiments described above can be added directly to raw ingredients for preparing foodstuffs. The resulting product is then added to the other raw ingredients of the foodstuff at about 0.01 to about 20.0 percent, preferably about 0.5 to about 5.0 percent by total weight of the raw ingredients used to prepare the foodstuff. For example, either the first or second embodiments can be incorporated into wheat flour dough by adding it to the flour, or any one of the five embodiments could be added to the moist dough. Further, the antimicrobial products of the present invention inherently inhibit the growth of a variety of other microorganisms, such mold, rope, bacteria and yeast and, thus, have far reaching applications. For example, the products can be used to sanitize food preparation equipment, to spray on air filters and humidifiers, and so forth. The technology of the present invention can also be used to improve the characteristics of antimicrobial products, such as potassium sorbate, which are currently used in cosmetics and pharmaceuticals, for example.

As an example of how to prepare tortillas comprising the antimicrobial product of this invention, when making wheat tortillas, the preferred ratio is 1 percent (1%) of the antimicrobial product of the first or second embodiments to the weight of the dry flour mix, although effective results have been obtained with a ratio of one-half percent (½%) to one and one-half percent (1 ½%).

Satisfactory results have been obtained utilizing the formula listed in the following Table 1 for the antimicrobial product of the first embodiment.

TABLE 1

| INGREDIENT | PERCENT BY WEIGHT |
|---|---|
| Azodicarbonamide | 0.004% |
| Potassium Sorbate | 49.998% |
| Calcium Propionate | 49.998% |

These percentages are considered optimal for tortillas; however, differing percentages may be appropriate under other circumstances. For example, certain wheat flour mixtures may require smaller or greater percentages. The percentages provided are intended to be exemplary of a preferred composition.

The following examples are set forth to exemplify the invention and should not be used to limit the invention.

EXAMPLE 1A

In tests conducted by the American Institute of Baking, a commercially produced tortilla flour was produced using 500 grams of QUAKER® flour mix and 215 grams of water at 100° F. The water and flour mixture was mixed for two minutes at a low speed and for another two minutes at a higher, second speed with a dough hook. The dough was allowed to stand for five minutes and then divided into 50-gram balls that were heat pressed at 175° F. The raw tortillas were then baked on a griddle at 450° F. for 30 seconds on each side with each side heated twice.

Tests were conducted under controlled conditions with certain flour tortillas identified as control specimens. Certain other specimens were prepared using 1.0 percent by weight of the antimicrobial product of this invention and 99.0 percent by weight of flour mixture following the same procedure set forth above for the control specimens. Tortillas from each test batch were evaluated after baking for flavor, odor, eating quality, and mold. The antimicrobial product included the percentages set forth above in Table 1.

A first test batch of each set was heat sealed in cellophane bags, double-bagged in ZIPLOCK® freezer pouches and stored at 25° C. A second test batch of each set of tortillas was inoculated with mold colonies isolated from previously molded bakery products and then also stored at 25° C. All test batches of tortilla samples were checked daily for visual signs of mold growth over a 21-day period.

By the end of the seventh day, visible signs of mold were present on the control wheat flour tortillas. However, the tortilla specimens containing the antimicrobial product of this invention had not molded by the end of the 21-day test. Additionally, tortillas containing the disclosed mold inhibitory composition had no off-flavor or undesirable texture at the 21-day period or anytime after baking. From the results of this test, The American Institute of Baking concluded that the disclosed antimicrobial product is an effective mold inhibitor in the production of wheat flour tortillas.

EXAMPLE 1B

Additional tests were run using the method of preparation disclosed in Example 1A. The tortillas (both the control batch and the batch containing the mold inhibitory compound) were subjected to 90° F. for 30 days. After such extreme conditions, the tortillas containing the antimicrobial product of this invention still exhibited no mold growth, although under the extreme conditions the tortillas did have a stale taste.

EXAMPLE 1C

Tests were also run comparing the tortillas prepared following the procedure outlined in Example 1A with tortillas containing 1.5 percent of a commercially available mold inhibitor. Both sets of tortillas did not mold after 21 days. However on day 1, the tortillas containing the commercially available mold inhibitor had a very acidic taste, whereas the tortillas containing the antimicrobial product of this invention had no acidic taste. Taste tests were run again at the 14-day mark. The tortillas containing the commercially available mold inhibitor had a bitter taste, whereas the tortillas containing the antimicrobial product of this invention had no acidic taste.

EXAMPLE 2A

Tests were performed on corn tortillas manufactured with MASECA® corn flour. One set included 0.7% by weight of sodium propionate as representative of a commercially available antimicrobial product. The other set included 1.0% of the antimicrobial product of this invention as set forth in Table 1.

The tortillas were prepared similarly to the method disclosed in Example 1A. During the testing period, the humidity was at 99% and the temperature was maintained at 115° F.

The dough and the tortillas of the test batch that contained the sodium propionate were off color with a light yellow appearance. No off color existed in the dough or the tortillas of the test batch containing the antimicrobial product of this invention. Other characteristics such as odor, flavor, and palatability were comparable.

The tortillas containing sodium propionate molded within 7 days. The tortillas containing the antimicrobial product as set forth in Table 1 molded in 13 days.

EXAMPLE 2B

Tests were performed on corn tortillas manufactured with MASECA® corn flour. One set included 0.7% by weight of sodium propionate as representative of a commercially available mold inhibitor. The other set included 1.0% of the antimicrobial product of this invention encompassing the second embodiment. The antimicrobial product contained 0.088% by weight of citric acid, 49.954% by weight calcium propionate, 49.954% by weight potassium sorbate, and 0.004% by weight of azodicarbonamide.

The tortillas were prepared similarly to the method disclosed in Example 1A. During the testing period, the humidity was maintained at 90% and the temperature was maintained at 115° F.

The dough and the tortillas of the test batch that contained the sodium propionate were off color with a light yellow appearance. No off color existed in the dough or the tortillas of the test batch containing the antimicrobial product of this invention. Other characteristics such as odor, flavor, and palatability were comparable.

The tortillas containing sodium propionate molded within 7 days. The tortillas containing the antimicrobial product of this invention molded in 15 days.

EXAMPLE 3

Tests were run to determine the effectiveness of the disclosed antimicrobial product in Neufchatel Cheese (cream cheese). Each sample included 8 ounces of cream cheese. Four different test batches were prepared. The first was a control with no antimicrobial products added. The remaining 3 batches contained, 0.750%, 0.500%, and 0.250%, respectively, of an antimicrobial product of this invention containing 0.088% by weight of citric acid, 49.954% by weight calcium propionate, 49.954% by weight potassium sorbate, and 0.004% by weight of azodicarbonamide.

Except the control, all samples were heated to 212° F. and held at that temperature for five minutes. The samples were then placed on aluminum foil. After cooling, all samples were covered with plastic wraps.

On Day 3 the control began to exhibit mold. On Day 7, the 0.250% sample began to show slight yellowing on the plastic wrap. On Day 17 the test was discontinued and the remaining samples tested. No mold appeared on either sample. Additionally the taste was good and no offensive odor existed in either sample.

EXAMPLE 4

Tests were run to determine the effectiveness of an antimicrobial product of this invention in cream cheese applied to a preformed, refrigerated Danish-style pastry dough. 0.25%, 0.50% and 0.625%, respectively, of an antimicrobial product of this invention containing 0.088% by weight of citric acid, 49.954% by weight calcium propionate, 49.954% by weight potassium sorbate, and 0.004% by weight of azodicarbonamide, were added to 8 ounces of cream cheese. The cream cheese was then applied to the center of a preformed, refrigerated Danish-style pastry dough. The samples were baked at 383° F. to 392° F., placed on aluminum foil, cooled, and packaged in polyethylene zipper closed bags and held at 32° C. No off-odor or off-taste was noted at the baking stage.

By Day 3, noticeable mold spots were forming on the control cheeses. By Day 6, all of the control rolls were developing molds. The test was terminated after 19 days. Despite heavy mold infestation of the rolls themselves, the cream cheese containing the antimicrobial product showed no signs of mold.

EXAMPLE 5

Two samples of corn tortillas were prepared. The first sample (T1) was prepared by mixing 2 cups flour, 1 ½ cups water, and 4.275 g of calcium propionate as the antimicrobial product. The second sample (T2) was prepared by mixing 2 cups flour, 1 ½ cups water, and 4.275 g of the antimicrobial product of this invention which contained 0.004% by weight of azodicarbonamide, 0.004% by weight of citric acid and the remainder being calcium propionate.

For each sample, all ingredients were mixed and 40 gram balls were flattened into approximately 6' round tortillas. The tortillas were each cooked on a hot griddle for approximately three minutes and then allowed to cool.

The pH of the dough and the finished product dissolved in water were taken. Odor and taste tests were also run with 5 being the best and 1 being the worst. The results are recorded below. The first number is the number of persons and the second number is the rating.

| TEST | T1 Results | T2 Results |
|---|---|---|
| pH dough | 5.60 | 5.77 |
| pH finished | 5.64 | 5.50 |

-continued

| TEST | T1 Results | T2 Results |
|---|---|---|
| Odor | 6/5 | 6/5 |
| Taste | 6/5 | 6/5 |
| Best Overall | 3/1, 3/2 | 3/1, 3/2 |

From the results listed above, no difference in taste or odor was initially found and no preference was indicated by the participants of the test.

After sampling and testing was complete, the tortillas were placed in an environment chamber maintained at about 80 to 85° F. and monitored daily for signs of mold. After 19 days the test was discontinued. Neither product showed signs of mold, but T1 had a distinctive, unpleasant odor while T2 had no unpleasant odor.

EXAMPLE 6

Five samples of apple walnut muffins were prepared using the following recipe: 127.69 g flour, 39.84 g vegetable oil, 45.45 g sugar, 25.54 g eggs, 3.58 g eggs, 4.26 g baking powder, 0.72 g cinnamon, ⅒ tsp. nutmeg, 68.44 g milk, 58.26 g shredded peeled apples, and 45.97 g walnut. TI was the control and included no antimicrobial agent. T2 included 1.27 g of antimicrobial product containing 0.004% by weight of citric acid, 0.004% azodicarbonamide, and the remainder being calcium propionate. T3 included 1.91 g of antimicrobial product containing 0.004% by weight of citric acid, 0.004% azodicarbonamide, and the remainder being calcium propionate. T4 included 1.27 g of antimicrobial product containing 19.0% by weight of citric acid, 0.004% azodicarbonamide, and the remainder being calcium propionate. T5 included 1.91 g of antimicrobial product containing 19.0% by weight of citric acid, 0.004% azodicarbonamide, and the remainder being calcium propionate.

All five samples were baked for 18 minutes at 375° F. Each was cooled and then placed in individual plastic zipper locked bags.

Tests were run on each sample, including the pH of the flour and antimicrobial product dissolved in water, the pH of a portion of a baked muffin dissolved in water, and the odor and taste of the baked muffin. The results listed in the following Table 2 were obtained with 5 being the best and 1 being the worst and the first number being the number of people issuing the rating.

TABLE 2

| SAMPLE | pH Flour | pH Muffin | Odor | Taste |
|---|---|---|---|---|
| T1 | 7.32 | 7.02 | 3/5, 1/4, 1/3 | 2/4, 1/5, 2/3 |
| T2 | 6.72 | 6.58 | 4/5, 1/5 | 4/5, 1/5 |
| T3 | 6.53 | 6.28 | 4/5, 1/4 | 4/5, 1/4 |
| T4 | 6.92 | 6.78 | 3/5, 2/4 | 3/5, 1/3, 1/4 |
| T5 | 7.01 | 6.85 | 5/5 | 3/5, 1/4, 1/3 |

The samples were monitored daily for signs of mold. Signs of mold appeared in three days in TI, five days in T2, six days in T3, 12 days in T4, and 9 days in T5.

EXAMPLE 7

Ten samples (T1–T10) of flour tortillas were prepared by adding the indicated percentage by weight of flour of an antimicrobial product of this invention to 454 g of all-purpose flour and mixing with 236.08 g water for each sample. The formulations of antimicrobial product and percentages listed in the following Table 3 were used.

TABLE 3

| SAMPLE | PERCENTAGE | FORMULATION BY WEIGHT % |
|---|---|---|
| T1 | 0.0 | Control - no mold growth inhibitor |
| T2 | 1.0 | 71% Sodium Propionate, 28.996% Citric Acid, and 0.004% Azodicarbonamide |
| T3 | 1.0 | 99.992% Calcium Propionate, 0.004% Citric Acid, and 0.004% Azodicarbonamide |
| T4 | 1.0 | 99.992% Sodium Propionate, 0.004% Zinc Oxide, and 0.004% Azodicarbonamide |
| T5 | 1.0 | 99.992% Calcium Propionate, 0.004% Zinc Oxide, and 0.004% Azodicarbonamide |
| T6 | 1.0 | 64.998% Calcium Propionate, 34.998% Potassium Sorbate, and 0.004% Azodicarbonamide |
| T7 | 1.0 | 80.998% Calcium Propionate, 18.998% Citric Acid, and 0.004% Azodicarbonamide |
| T8 | 1.0 | 80.998% Sodium Propionate, 18.998% Citric Acid, and 0.004% Azodicarbonamide |
| T9 | 1.0 | 80.998% Sodium Propionate, 18.998% Zinc Oxide, and 0.004% Azodicarbonamide |
| T10 | 1.0 | 80.998% Calcium Propionate, 18.998% Zinc Oxide, and 0.004% Azodicarbonamide |

For each sample, all ingredients were mixed and 40 gram balls were flattened into approximately 6' round tortillas. The tortillas were each cooked on a hot griddle at 450° F. to 475° F. for approximately three minutes and then allowed to cool.

All samples were placed in an environmental chamber maintained at 80° F. to 85° F. Samples were checked daily for mold growth. The test was started on Apr. 21, 1995 and Apr. 24, 1995. The test was terminated on May 22, 1995. The results listed in the following Table 4 were obtained.

TABLE 4

| SAMPLE | START DATE | TERMINATION DATE (when mold appeared) |
|---|---|---|
| T1 | 4/21/95 | 4/26/95 |
| T2 | 4/21/95 | 5/22/95 (still mold-free) |
| T3 | 4/21/95 | 5/22/95 (still mold-free) |
| T4 | 4/21/95 | 4/29/95 |
| T5 | 4/21/95 | 4/30/95 |
| T6 | 4/24/95 | 5/10/95 |
| T7 | 4/24/95 | 5/10/95 |
| T8 | 4/24/95 | 5/22/95 (still mold-free) |
| T9 | 4/24/95 | 5/4/95 |
| T10 | 4/24/95 | 5/5/95 |

Taste tests were also completed after the products were grilled. The results listed in the following Table 5 were obtained.

TABLE 5

| SAMPLE | TASTE TEST FINDINGS |
|---|---|
| T1 | No odor, good taste |
| T2 | Slight smell, good taste |
| T3 | No odor, good taste |
| T4 | No odor; good taste |
| T5 | No odor, good taste |
| T6 | No odor, good taste |
| T7 | No odor, good taste |
| T8 | No odor, good taste |
| T9 | No odor, good taste |
| T10 | No odor, good taste |

On samples T1 through T5, the preferred sample was either T1, T2, or T3, no one being able to differentiate one from the other. On samples T6 through T10, no one could differentiate between the samples.

EXAMPLE 9

Testing was performed on prior art mold inhibitors and samples of the antimicrobial products of this invention to determine pH, color, odor, and taste of the various products.

A pre-pH test was run on each sample by mixing 5 grams of sample with 45 grams of water. The pre-pH test results are listed below.

For the remaining tests, each sample mixture consisted of 45 grams of antimicrobial product and 30 grams of water. Each sample was dried in a 380° F. oven for 20 minutes and then allowed to dry completely in a 250° F. oven for up to 10 minutes longer. The color, odor and taste of each treated sample were then recorded. Post pH was also taken of the treated sample by adding 5 grams of the treated sample with 45 grams water.

The samples contained the following ingredients in weight percent, T1—100% Potassium Sorbate; T2—100% Sodium Propionate; T3—100% Calcium Propionate; T4—100% Citric Acid; T5—99.992% Potassium Sorbate, 0.004% Citric Acid and 0.004% Azodicarbonamide; T6—99.992% Potassium Sorbate, 0.004% Zinc Oxide and 0.004% Azodicarbonamide; T7—99.992% Potassium Propionate, 0.004% Citric Acid and 0.004% Azodicarbonamide; T8—99.992% Potassium Propionate, 0.004% Zinc Oxide and 0.004% Azodicarbonamide; T9—99.992% Calcium Propionate, 0.004% Citric Acid and 0.004% Azodicarbonamide; T10—99.992% Calcium Propionate, 0.004% Zinc Oxide and 0.004% Azodicarbonamide; T11—99.992% Citric Acid, 0.004% Zinc Oxide and 0.004% Azodicarbonamide; and T12—99.996% Citric Acid and 0.004% Azodicarbonamide.

The results listed in the following Table 6 were recorded.

TABLE 6

| Sample | Pre-pH | Post-pH | Color | Odor | Taste |
|---|---|---|---|---|---|
| T1 | 9.12 | 9.56 | off-white | slight | slightly bitter |
| T2 | 7.92 | 9.56 | off-white | slight | slightly bitter |
| T3 | 8.01 | 8.97 | off-white | slight | slightly bitter |
| T4 | 1.90 | 1.86 | orange | slight | bitter |
| T5 | 7.41 | 8.68 | light cream (lighter than control) | none | none |
| T6 | 7.41 | 8.89 | light cream (lighter than control) | none | none |
| T7 | 7.19 | 8.76 | white | none | none |
| T8 | 7.68 | 8.56 | white | none | none |
| T9 | 7.48 | 7.28 | white | none | none |

TABLE 6-continued

| Sample | Pre-pH | Post-pH | Color | Odor | Taste |
|---|---|---|---|---|---|
| T10 | 7.45 | 7.39 | white | none | none |
| T11 | 1.68 | 1.46 | clear | none | not as tangy |
| T12 | 1.80 | 1.44 | clear | none | not as tangy |

EXAMPLE 10

Field tests were designed to determine the effectiveness of the mold growth inhibitors of this invention on all aspects of cheese manufacture, maturation, functionality and flavor.

The protocol was designed with Vat 1 being the Control, i.e., no mold growth inhibitor added, Vat 2 including 0.25 percent by weight of total raw ingredients for preparing the cheese product being a mold growth inhibitor of this invention, and Vat 3 including 0.50 percent by weight of total raw ingredients for preparing the cheese product being a mold growth inhibitor of this invention. The mold growth inhibitor contained 49.991% by weight calcium propionate, 49.991% by weight potassium sorbate, 0.004% by weight citric acid, and 0.004% by weight azodicarbonamide.

The following Table 7 lists the parameters used in preparing the mozzarella cheese.

TABLE 7

Summary of Mozzarella Manufacturing

|  | Vat 1 (Control) | Vat 2 (.25%) | Vat 3 (.50%) |
|---|---|---|---|
| P/F Ratio | 1.7 | 1.7 | 1.7 |
| Pasteurizing temp (° C.) | Standard | Standard | Standard |
| Temp milk to vat (° C.) | 34.5 | 34.5 | 34.5 |
| Starter type | Mesophiles | Mesophiles | Mesophiles |
| Starter ratio | 1:1:1 | 1:1:1 | 1:1:1 |
| Starter % | 4 | 4 | 4 |
| Prime to pH | 6.35 | 6.35 | 6.35 |
| Rennet type | Calf | Calf | Calf |
| ml Rennet/100 liters milk | 7 | 7 | 7 |
| Setting time (min) | –25 | –25 | –25 |
| Cook temp (° C.) | 39.5 | 39.5 | 39.5 |
| Drain pH | 5.90 | 5.90 | 5.90 |
| Salt added to C/S Water | 1.25 kg | 1.2 kg | 1.2 kg |
| Salting rate-curd | 170 g/100/milk | 170 g/100/milk | 170 g/100/milk |
| Substance X | 0 | Container A* | Container B* |
| Mellowing time (min) | 15 | 15 | 15 |
| Stretching temp (° C.) | 65 | 65 | 65 |
| Packed in | 10 kg bags | 10 kg bags | 10 kg bags |
| Cooling water (° C.) | 5–10 | 5–10 | 5–10 |

*Container A contains 0.25%; Container B contains 0.50%.

The following Table 8 lists the parameters used in preparing the cheddar cheese. The mold growth inhibitor was listed as Substance X and was added two minutes after vatting.

TABLE 8

Summary of Cheddar Manufacturing

|  | Vat 1 (Control) | Vat 2 (.25%) | Vat 3 (.50%) |
|---|---|---|---|
| P/F Ratio | 0.8 | 0.8 | 0.8 |
| Pasteurizing temp (° C.) | Standard | Standard | Standard |
| Temp milk to vat (° C.) | 32 | 32 | 32 |
| Starter type | Mesophiles | Mesophiles | Mesophiles |
| Starter ratio | 1:1:1 | 1:1:1 | 1:1:1 |
| Starter % | 1.4 | 1.4 | 1.4 |
| Rennet type | Calf | Calf | Calf |
| ml Rennet/100 liters milk | 16 | 16 | 16 |
| Setting time (min) | –30 | –30 | –30 |
| Cook temp (° C.) | 38 | 38 | 38 |
| Drain pH | 6.20 | 6.20 | 6.20 |
| Salt added to C/S Water | 1.25 kg | 1.2 kg | 1.2 kg |
| Salting rate-curd | 270 g/100/milk | 270 g/100/milk | 270 g/100/milk |
| Substance X | 0 | Container A* | Container B* |
| Pressing | Normal | Normal | Normal |
| Packed in | 20 kg bags | 20 kg bags | 20 kg bags |
| Storage temp(° C.) | 10 | 10 | 10 |

*Container A contains 0.25%; Container B contains 0.50%.

After manufacture, the cheese samples were cut into blocks of approximately 1 kg (2.2 lb) to simplify subsequent sampling. The mozzarella blocks were stored at –2° C. and the cheddar blocks were stored at 10° C.

At 48 hours post manufacture the chemical compositions of the cheese products were evaluated. These results are shown in the following Table 9.

TABLE 9

Summary of Chemical Data 48 Hours Post Manufacture

| Test SSU | C02003 Fat % | C03003 Moisture % | C07000 pH | C08000 Salt % |
|---|---|---|---|---|
| 3/14/95 Mozzarella |  |  |  |  |
| Vat 1 (Control) | 20.0 | 47.1 | 5.44 | 1.48 |
| Vat 2 (.25%) | 19.5 | 47.4 | 5.41 | 1.50 |
| Vat 3 (.50%) | 19.5 | 48.2 | 5.42 | 1.49 |
| 3/15/95 Cheddar |  |  |  |  |
| Vat 1 (Control) | 34.5 | 36.3 | 5.11 | 1.75 |
| Vat 2 (.25%) | 34.5 | 36.2 | 5.24 | 1.75 |
| Vat 3 (.50%) | 34.0 | 35.8 | 5.34 | 1.88 |

Also at 48 hours post manufacture the microbial composition of the cheese products were evaluated. These results are shown in the following Table 10.

TABLE 10

Microbial Data Summary 48 Hours Post Manufacture

| Sample | Phosphate | Coliform | E. Coli | Yeast & Mold | NSLAB | COAG Staph | POS c/u/g | JAP THD lg | APC lg |
|---|---|---|---|---|---|---|---|---|---|
| Cheddar | | | | | | | | | |
| Vat 1 - Control | P | <10 | neg | <10 | 1600 | 0, 0, 0 | <10 | | |
| Vat 2 - 0.25% | P | <10 | neg | <10 | 2000 | 2, 2, 0 | 40 | | |
| Vat 3 - 0.50% | p | <10 | neg | <10 | 340 | 2, 1, 0 | 30 | | |
| Mozzarella | | | | | | | | | |
| Vat 1 - Control | P | <10 | neg | <10 | <10 | neg 0, 0, 0 | neg <10 | 380 | 2600 |
| Vat 2 - 0.25% | P | <10 | neg | <10 | 30 | neg 0, 0, 0 | <10 | 160 | 1200 |
| Vat 3 - 0.50% | P | <10 | neg | <10 | <10 | neg 0, 0, 0 | <10 | 300 | 1200 |

Immediately after the block samples were prepared, 2×100 gram samples were shredded from the block samples and placed in individual zipper locked bags at 25° C. and 4° C. Each sample was examined visually each day for mold growth. The results of the 25° C. test are recorded in FIG. 1. As shown, after 30 days, no mold was present on either of the cheddar samples containing the mold growth inhibitor of this invention.

Figure 2:
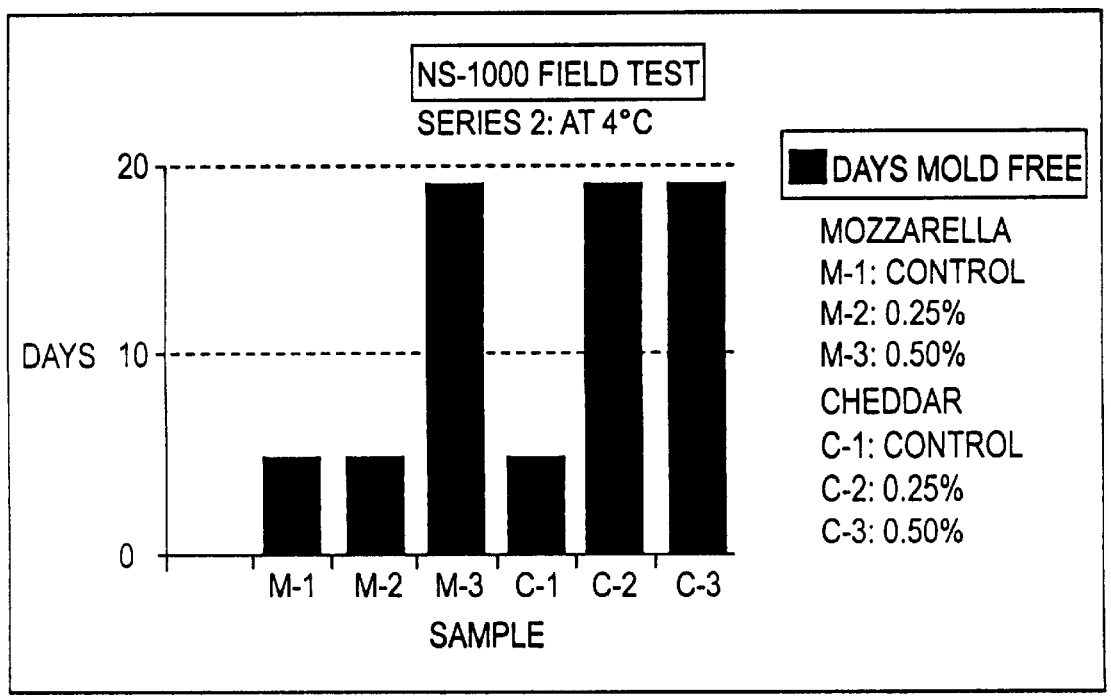
FIG. 2 is a Summary of Yeast and Mold Growth on Cheeses at 4° C. (40° F.).

Partial results of the 4° C. test are shown in FIG. 2. At 19 days into the 30 day test, the mozzarella sample containing 0.5% of the antimicrobial product of this invention and both the cheddar samples were mold free.

Immediately after the samples were prepared, the samples containing the antimicrobial product of this invention were evaluated and given points for flavor, background, bitterness, and so forth. From a possible 105 points, the mozzarella samples containing the antimicrobial product of this invention were awarded 92 points giving an 88% rating. From a possible 72 points, the cheddar was awarded 67 points for a 93% rating.

EXAMPLE 11

A sample of potassium sorbate was prepared using the gas phase technology of the present invention. Before treatment, the potassium sorbate had a 99.4% purity and a distinctive off-odor and off-taste. The potassium sorbate was placed in a gas-tight container at approximately room temperature. An ammonia gas was then injected into the container until the partial pressure of ammonia gas within the container was approximately 0.5 atmospheres. The container was then rotated several turns to cause the potassium sorbate sample to blend completely with the ammonia gas within the container. After approximately two minutes, the ammonia gas was removed from the container by applying a vacuum to the container of approximately 0.5 atmospheres for about 5 minutes. The resulting product had no detectable off-odor or off-taste. In tests conducted by the applicant, the potassium sorbate sample proved to be a highly effective antimicrobial product in wheat flour tortillas without imparting any off-odor or off-flavor to the tortillas.

Samples of calcium propionate, sodium propionate, calcium acetate and sodium benzoate were also prepared using the gas phase technology of the present invention. These samples were prepared in the same manner as explained above in working example 11. The resulting products had no detectable off-odor or off-taste.

EXAMPLE 12

A sample containing approximately 17% potassium sorbate and 83% calcium propionate was prepared using the gas phase technology of the present invention. This sample initially had a distinctive off-odor and off-taste. The sample was exposed to ammonia gas in the same manner described above in Example 11 to convert the free acids in the sample to ammonium salts. The resulting sample had no detectable off-odor or off-taste.

The sample was then used at the rate of approximately 1% by weight to treat flour tortilla dough prepared using the following recipe: 454 g flour, 45.4 g vegetable oil, 9.08 g double baking powder, 9.08 g salt, 191.08 g tap water at 110° F., 4.54 g yeast, 0.09 g sugar, and 3 g citric acid. A control batch of flour tortilla dough was prepared following this same recipe, without adding any antimicrobial compound. The dough from both the treated batch and the control batch was measured into 40 g balls, which were flattened and cooked on a hot griddle for approximately three minutes and then allowed to cool.

The pH of the dough and the cooked tortillas dissolved in water were taken for both batches. The untreated dough had a pH of 5.39, while the treated dough had a pH of 5.49. The untreated cooked tortilla had a pH of 5.23, while the treated cooked tortilla had a pH of 5.69. The tortillas were then placed in an environment chamber maintained at about 85° F. and monitored daily for signs of mold. The untreated tortillas had visible mold starting after seven days. The test was discontinued after 18 days, at which time there was no visible mold on the treated tortillas.

While this invention has been described in relation to the preferred embodiments, it is to be understood that various modifications thereof will now be apparent to one skilled in the art upon reading this specification, and it is intended that all such modifications that fall within the scope of the following claims be covered by this application.

What is claimed is:

1. A method of preparing an antimicrobial product, comprising:

selecting a compound from the group consisting of sodium benzoate, calcium benzoate, potassium benzoate, sodium diacetate, paraben, niacin, calcium acetate, calcium diacetate, sodium sorbate, calcium sorbate, potassium sorbate, sodium propionate, calcium propionate, potassium propionate and mixtures thereof, which compound contains only a small amount of free acids; and exposing the selected compound to an ammonia gas to convert the free acids in the selected compound into ammonium salts and thereby minimize undesirable flavors or odors of the product.

2. The method of preparing an antimicrobial product according to claim 1, wherein said compound is selected from the group consisting of sodium sorbate, calcium sorbate, potassium sorbate, sodium propionate, calcium propionate, potassium propionate and mixtures thereof.

3. A method of preparing an antimicrobial product, comprising:

exposing a compound selected from the group consisting of benzoic acid, sodium benzoate, calcium benzoate, potassium benzoate, acetic acid, sodium diacetate, paraben, niacin, calcium acetate, calcium diacetate, citric acid lactic acid, fumaric acid, sorbic acid, sodium sorbate, calcium sorbate, potassium sorbate, propionic acid, sodium propionate, calcium propionate, potassium propionate and mixtures thereof, to an ammonia gas to convert free acids in the selected compound into ammonium salts and thereby minimize undesirable flavors or odors of the product; and applying a vacuum to said compound, after exposing said compound to said ammonia gas, to remove any residual ammonia gas remaining in said product.

4. The method of preparing an antimicrobial product according to claim 3, wherein said step of applying a vacuum comprises applying a vacuum of 0.9 to 0.0001 atmospheres.

5. The method of preparing an antimicrobial product according to claim 1, further comprising the step of mechanically blending said compound while said compound is being exposed to said ammonia gas.

6. The method of preparing an antimicrobial product according to claim 1, wherein said ammonia gas has a partial pressure of approximately 0.01 to 1.0 atmospheres while said compound is exposed thereto.

7. A method of preparing an antimicrobial product, comprising:

exposing a compound selected from the group consisting of benzoic acid, sodium benzoate, calcium benzoate, potassium benzoate, acetic acid, sodium diacetate, paraben, niacin, calcium acetate, calcium diacetate, citric acid, lactic acid, fumaric acid, sorbic acid, sodium sorbate, calcium sorbate, potassium sorbate, propionic acid, sodium propionate, calcium propionate, potassium propionate and mixtures thereof, to an ammonia gas to convert free acids in the selected compound into ammonium salts and thereby minimize undesirable flavors or odors of the product; and heating said compound, after being exposed to said ammonia gas, to a temperature sufficient to aid in the removal of any residual ammonia gas remaining in said product.

8. The method of preparing an antimicrobial product according to claim 1, wherein said product is for incorporation into foodstuffs, and said compound is exposed to said ammonia gas before incorporating said product into a foodstuff, such that when said product is incorporated into a foodstuff in an amount sufficient to cause microbial growth inhibition it does not impart an undesirable flavor, odor, texture or color to the foodstuff.

9. The method of preparing an antimicrobial product according to claim 1, further comprising the steps of:

a) placing a layer of azodicarbonamide on a substrate;

b) covering said layer of azodicarbonamide with a gas permeable separator;

c) superimposing a layer of said compound on top of the separator to form a tri-layered combination; and d) heating the tri-layered combination to a sufficient temperature for a sufficient time to cause said azodicarbonamide to decompose and react with said compound to form said antimicrobial product with substantially no off-flavor, off-odor, off-texture or off-color.

10. The method of preparing an antimicrobial product according to claim 9, wherein said heating step includes exposing said tri-layered combination to a temperature greater than about 320° F. to decompose and vaporize the azodicarbonamide to form decomposition gases, including said ammonia gas, that permeate said separator and react with the compound to form said product.

11. The method of preparing an antimicrobial product according to claim 10, further including the step of mixing said azodicarbonamide with a decomposition enhancing compound before placing said azodicarbonamide on said substrate, said decomposition enhancing compound being selected from the group consisting of a metal oxide, metal salt, organometallic complex, citric acid, calcium sulfate, triethanolamine and mixtures thereof.

12. A method of inhibiting microbial growth in foodstuffs including creating said foodstuffs by mixing raw ingredients for preparing said foodstuffs with an antimicrobial product prepared by the method according to claim 1.

13. A method of preparing an antimicrobial product for incorporation into foodstuffs, including:

selecting a compound from the group consisting of sodium benzoate, calcium benzoate, potassium benzoate, sodium diacetate, paraben, niacin, calcium acetate, calcium diacetate, sodium sorbate, calcium sorbate, potassium sorbate, sodium propionate, calcium propionate, potassium propionate and mixtures thereof, which compound contains only a small amount of free acids: and reacting the selected compound with an ammonia gas to convert the free acids in the selected compound into ammonium salts, before incorporating said product into a foodstuff, such that when said product is incorporated into a foodstuff in an amount sufficient to cause microbial growth inhibition it does not impart an off-flavor, off-odor, off-texture or off-color to the foodstuff.

14. The method of preparing an antimicrobial product according to claim 13, wherein said compound is selected from the group consisting of sodium sorbate, calcium sorbate, potassium sorbate, sodium propionate, calcium propionate, potassium propionate and mixtures thereof.

15. The method of preparing an antimicrobial product according to claim 13, wherein said compound is placed in an air-tight chamber and said ammonia gas is substantially uniformly mixed with said compound to form said product.

16. The method of preparing an antimicrobial product according to claim 1, wherein said selected compound is in a dry powder form when exposed to said ammonia gas.

17. The method of preparing an antimicrobial product according to claim 13, wherein said selected compound is in a dry powder form when exposed to said ammonia gas.

* * * * *